(12) United States Patent
Lee et al.

(10) Patent No.: US 7,050,961 B1
(45) Date of Patent: May 23, 2006

(54) SOLUTION GENERATION METHOD FOR THIN CLIENT SIZING TOOL

(75) Inventors: Sharon Marie Lee, Mission Viejo, CA (US); Leonard Eugene Eismann, Rancho Santa Margarita, CA (US); Kathryn Ann McDonald, Yorba Linda, CA (US)

(73) Assignee: Unisys Corporation, Blue Bell, PA (US)

( * ) Notice: Subject to any disclaimer, the term of this patent is extended or adjusted under 35 U.S.C. 154(b) by 857 days.

(21) Appl. No.: 09/813,670

(22) Filed: Mar. 21, 2001

(51) Int. Cl.
  *G06F 9/45*   (2006.01)
  *G06F 15/16*  (2006.01)
  *G06F 15/173* (2006.01)

(52) U.S. Cl. .................. 703/22; 718/104; 709/203; 709/226; 703/23

(58) Field of Classification Search ........ 709/220–222, 709/203, 249, 223, 225, 226, 238–242, 227–228; 703/26, 22, 23; 707/10; 715/853; 718/104
See application file for complete search history.

(56) References Cited

U.S. PATENT DOCUMENTS

| | | | | |
|---|---|---|---|---|
| 5,500,934 A | * | 3/1996 | Austin et al. ............... | 715/853 |
| 5,668,995 A | * | 9/1997 | Bhat .......................... | 718/104 |
| 6,041,325 A | * | 3/2000 | Shah et al. .................. | 707/10 |
| 6,212,559 B1 | * | 4/2001 | Bixler et al. ................ | 709/221 |
| 6,457,048 B1 | * | 9/2002 | Sondur et al. .............. | 709/220 |
| 6,496,948 B1 | * | 12/2002 | Smorodinsky ............... | 714/37 |
| 6,571,283 B1 | * | 5/2003 | Smorodinsky ............... | 709/220 |
| 6,665,714 B1 | * | 12/2003 | Blumenau et al. .......... | 709/222 |
| 6,754,702 B1 | * | 6/2004 | Kennelly et al. ........... | 709/223 |
| 2002/0095487 A1 | * | 7/2002 | Day et al. ................... | 709/223 |
| 2002/0156904 A1 | * | 10/2002 | Gullotta et al. ............. | 709/229 |

OTHER PUBLICATIONS

Schmidt et al., B.K. The Interactive Performance of SLIM: A Stateless Thin-Client Architecture, ACM SIGOPS Operating Systems Review, Proceedings of the 17th ACM Symposium on OPerating Systems Principles SOSP '99, Dec. 1999, pp. 32-47.*

* cited by examiner

*Primary Examiner*—Russell Frejd
(74) *Attorney, Agent, or Firm*—Alfred W. Kozak; Mark T. Starr; Lisa A. Rode

(57) ABSTRACT

A method is provided for generating a configuration solution such as for a Server Farm or a Server Metafarm which can be optimally designed and configured after information has been developed on the customer's profile and there has been calculated a base solution indicating the appropriate number of servers, proper disk space and memory requirements.

3 Claims, 6 Drawing Sheets

SOLUTION GENERATION

SOLUTION GENERATION METHOD FOR THIN CLIENT SIZING TOOL

FIELD OF THE INVENTION

This disclosure describes a method for generating a configuration solution suitable for a Thin Client Sizing Tool such that, after a customer's profile information is developed, this method provides a way for calculating a base solution showing the appropriate number of servers, proper disk space and memory requirements.

CROSS-REFERENCES TO RELATED APPLICATIONS

This application is related to the co-pending applications designated hereinbelow and included herein by reference.
U.S. Ser. No. 09/813,667, entitled "THIN CLIENT SIZING TOOL FOR ENTERPRISE SERVER FARM SOLUTION CONFIGURATOR";
U.S. Ser. No. 09/813,671, entitled "CONFIGURATION INTERVIEW SESSION METHOD FOR THIN CLIENT SIZING TOOL";
U.S. Ser. No. 09/813,672, entitled "METAFARM SIZER CONFIGURATION OPTIMIZATION METHOD";
U.S. Ser. No. 09/813,668, entitled "METHOD FOR CALCULATING USER WEIGHTS FOR THIN CLIENT SIZING TOOLS;
U.S. Ser. No. 09/813,669, entitled METHOD FOR CALCULATING MEMORY REQUIREMENTS FOR THIN CLIENT SIZING TOOL";
U.S. Pat. No. 6,496,948, entitled "METHOD FOR ESTIMATING THE AVAILABILITY OF AN OPERATING SERVER FARM";
U.S. Pat. No. 6,571,283, entitled "METHOD FOR SERVER FARM CONFIGURATION OPTIMIZATION";
U.S. Ser. No. 09/705,441 entitled "METHOD FOR SERVER METAFARM CONFIGURATION OPTIMIZATION".

BACKGROUND OF THE INVENTION

Many businesses, groups and companies have come to develop enterprise server configurations to handle their many types of information processing, and corporate and group operational problems. Many different types of problem situations are presented to a designer, a proposal-maker, or a configurator of Server Farm facilities, such personnel having the purpose for the layout, design and configuration of computer server facilities meeting and providing the specialized requirements of a particular customer in the most optimal fashion.

Many of the earlier attempts in the prior art in trying to determine the appropriate number of servers, disk space, and memory requirements (which would be necessary for proper and efficient operation of an Enterprise Server system for a particular customer) have found this to be a formidable task with much guesswork and uncertainty.

After the accumulation of large amounts of data and information regarding the customer and the development of a customer profile, it is then desirable to have some orderly arrangement to collect and manage this information in order to configure a particular type of Server Farm system in conjunction with the associated disk and memory requirements which would be necessary to support operations with the associated servers. Of course, this is also involved with considerations as to gaining the minimum amount of cost, the minimum price, and the minimum amount of downtime for the particular configuration.

In the overall system for Thin Client Sizing, one aspect involved is the development of a configuration solution. Thus, there needs to be some method for developing a base solution which will give some indication of the appropriate number of servers, the associated suitable disk space and adequate memory requirements. These types of solutions are based on benchmark testing data provided by a responsible Engineering Group for the currently supported servers in addition to an adjusted user total number of servers derived from the customer profile information involving the number and types of users, and the types of application programs employed.

A sequence of operations are involved using window screens as was indicated in the co-pending U.S. Ser. No. 09/813,667, wherein a series of windows were provided into which information could be provided as input.

The present method disclosed herein provides a useable portion of the overall Thin Client Sizing Tool by providing a configuration solution specifically designed and arranged for the needs and requirements of a particular customer as determined from the customer's profile.

SUMMARY OF THE INVENTION

A method is provided for generating a configuration solution for a Thin Client Sizing Tool which is based on engineering-provided benchmark tested data for designated servers, so that customer profile information about the number and types of users, and the types of applications employed can be used as input to decide upon the appropriate number of servers which should be configured together with the appropriate disk space and memory requirements.

For each site and for each Server Farm, a set of reports are generated beginning with an Optional Software report which designates the features and capabilities selected and stored as the customer profile in the configuration session database 50 during the interview session. This report is displayed in the Application Delivery Solution Configurator program 60 within the Optional Software Tab window.

Then for each user-type defined in the Server Farm, and for each application program used in the Server Farm, a calculation is made to provide and calculate disk capacity requirements which will be needed for each user type using the application. In addition, application sizing information is garnered from the sizing database 30 for further input in order to calculate the appropriate capacity of disk requirements which will be needed. This data is then used to fill out a Disk Capacity report for display in the Disk Capacity Tab window of the Solution Configurator program 60.

A Customer Data report is then filled out and displayed within the Customer Data Tab window of the program 60. The data used to fill out this report consists of the data that is stored as the customer profile in the Configuration Session Database 50 during the customer interview.

Subsequently, the user-weights (whether light, medium, heavy or super heavy), are calculated using as input information about the user types and the applications they use. This calculation is described further in the method described in co-pending U.S. Ser. No. 09/813,668.

Then, each server model that has information stored within the server information database 20 is considered and information pertaining to the server is accessed in order to calculate the total number of adjusted users and the transmission requirements in kilobits per second. Using this information, the method sequence will then determine and calculate the actual number of the particular server models that are necessary for solving or meeting the customer's configuration requirements.

After calculation of the memory requirements for the server, the server's solution is added to fill-out the Base Solutions report displayed in the Base Solutions Tab window, which then can be manipulated to calculate the default availability level as described in co-pending U.S. Pat. No. 6,496,948, entitled "METHOD FOR ESTIMATING THE AVAILABILITY OF AN OPERATING SERVER FARM". Then this input is provided to fill out the inter-active Availability report and Availability Calculator that is displayed on the Availability Tab window of the configurator program 60.

The Network Capacity report is then filled out with the transmission kilobits per second information and also displayed on the Network Capacity Tab window of the configurator program 60.

After each server model is considered within each server farm, a warning message is issued if one or more of the server farms required more than the recommended maximum number of servers. Hence, the solution generation is now completed so that the proper number of servers, the proper number of Server Farms, the desired Availability levels have been developed, plus the disk capacity and memory requirements have also been indicated in order to make a suitable configuration arrangement of Server Farms suitable for meeting the customer-user requirements.

GLOSSARY LIST OF RELEVANT ITEMS

Figure 1A:
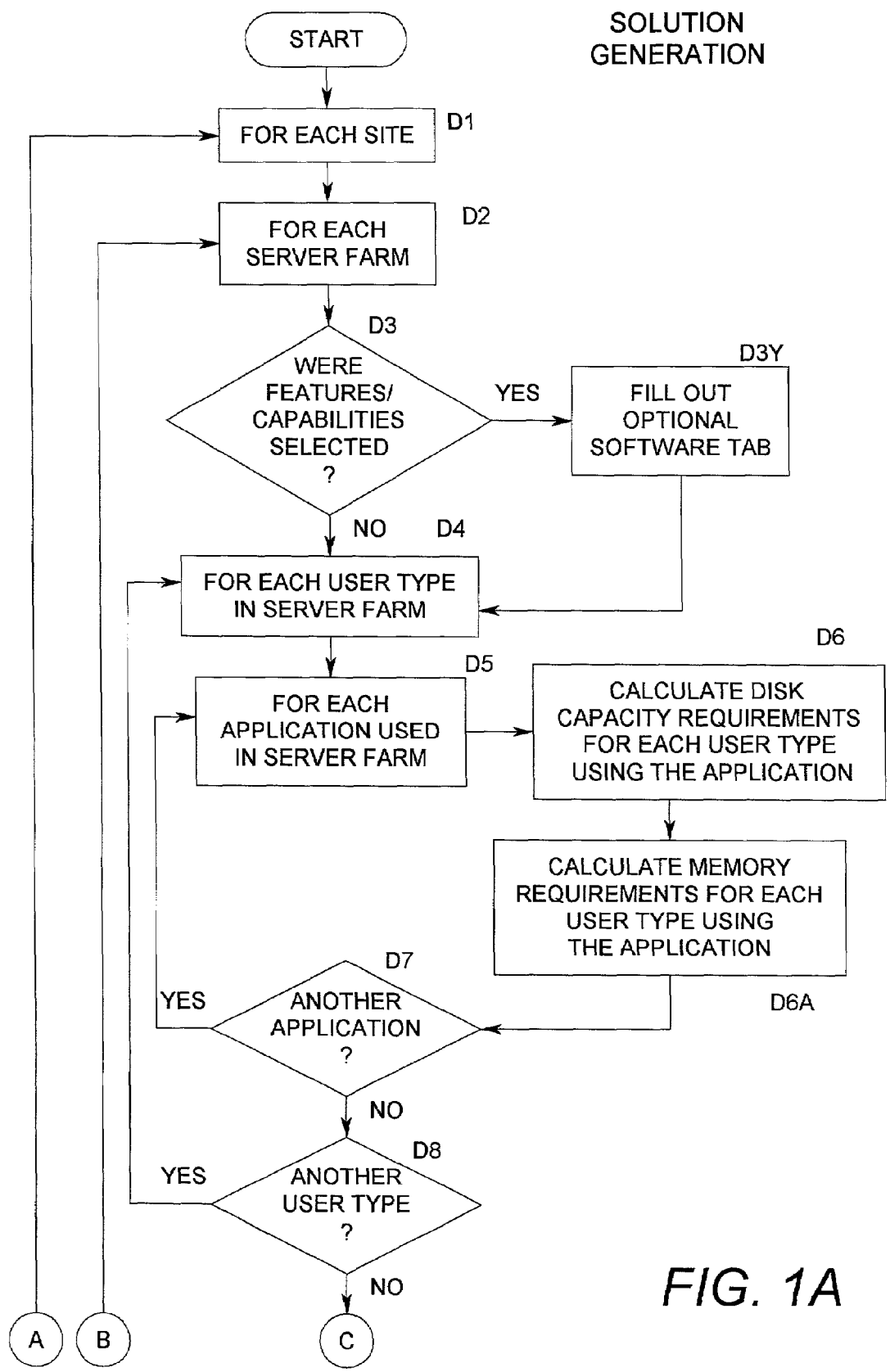
FIGS. 1A, 1B, 1C and 1D show a flowchart which indicates the various steps involved in order to provide a solution generation for the Thin Client Sizing Tool.
Figure 1B:
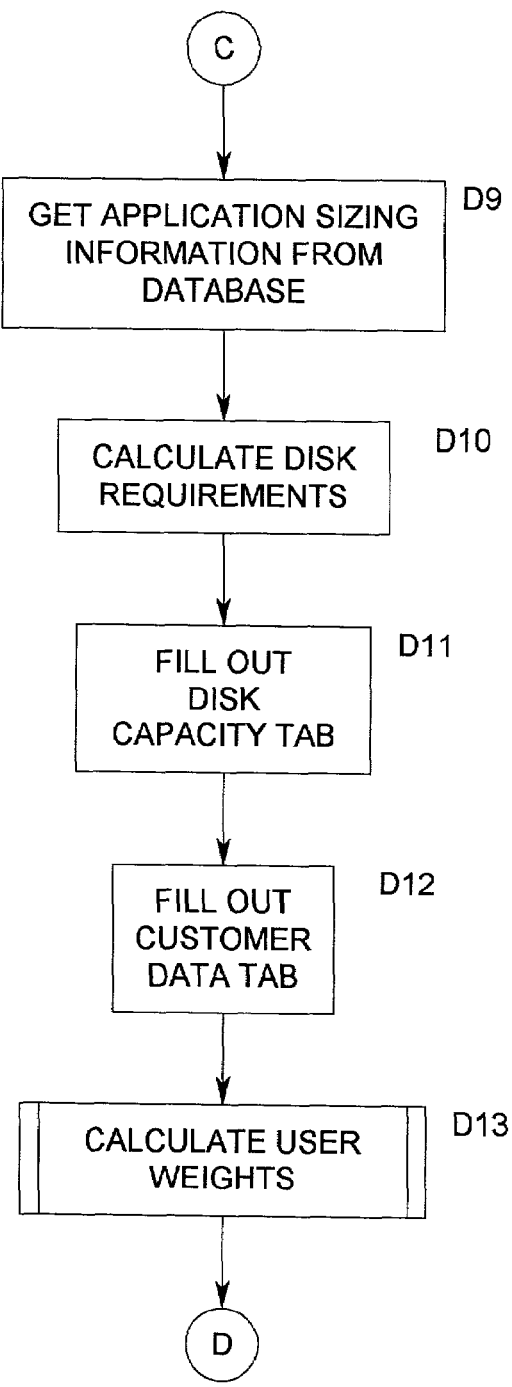
Figure 1C:
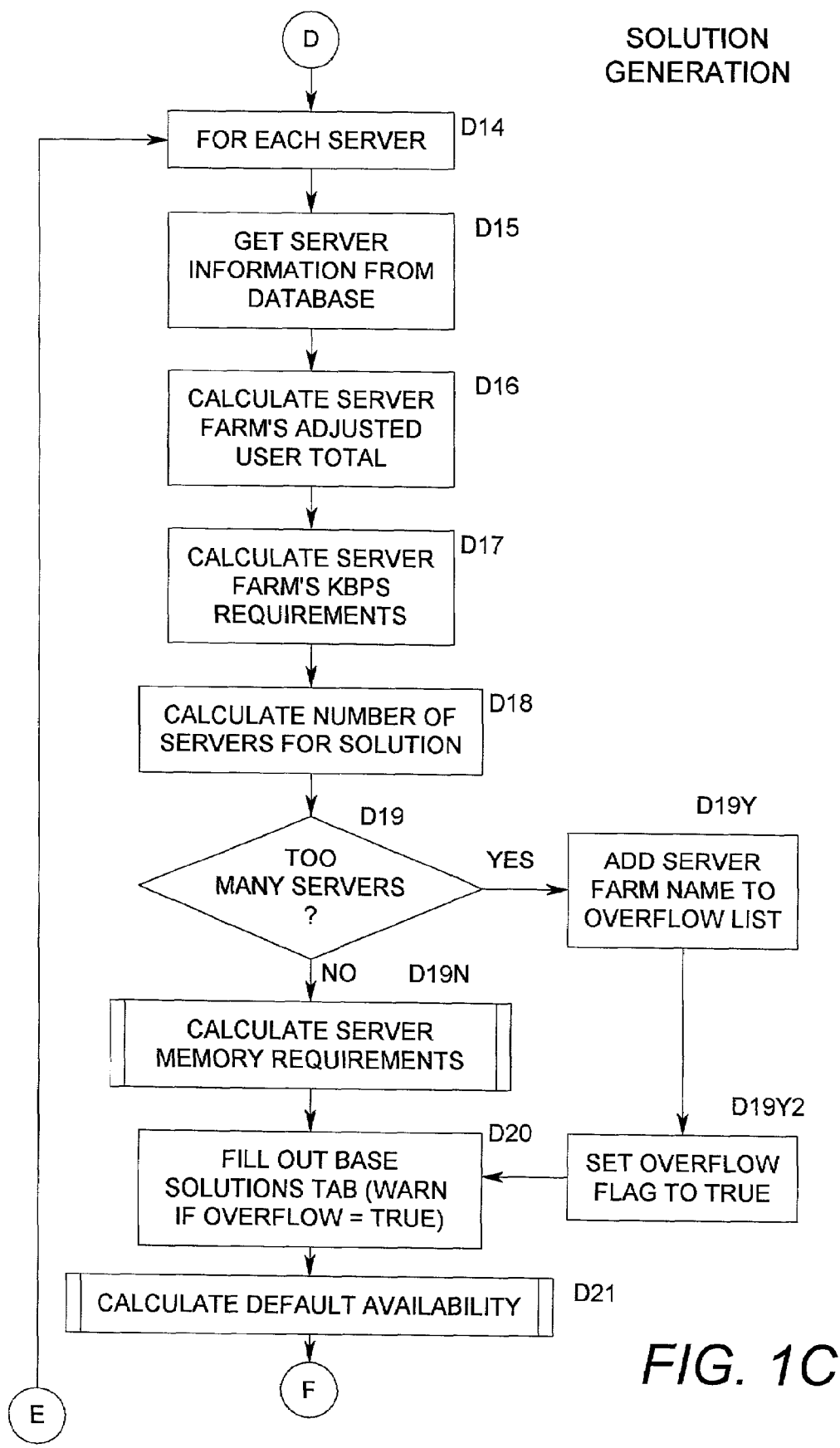
Figure 1D:
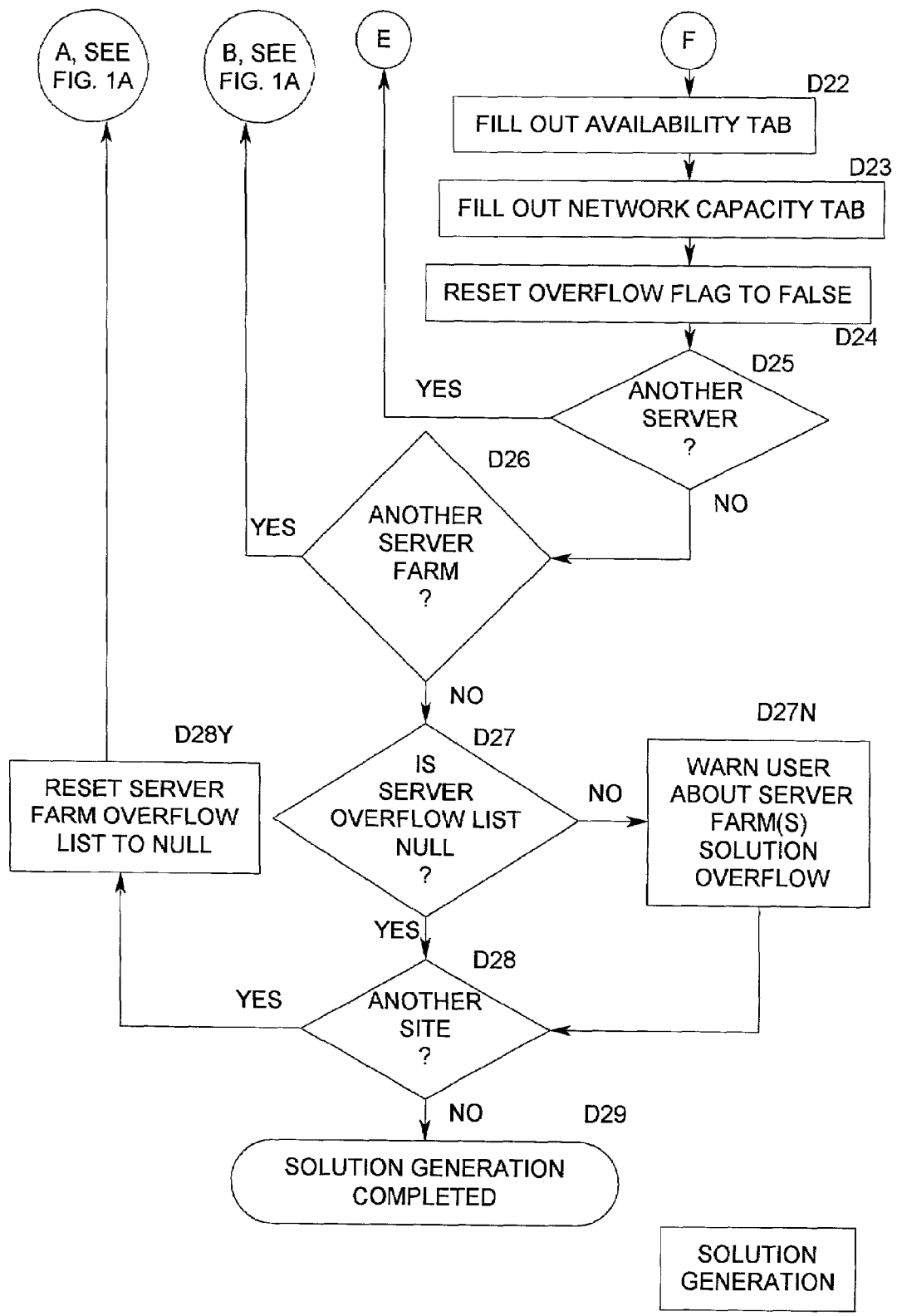

1. ADJUSTED USER TOTAL (SERVER FARM): The normalized total number of Users that will be supported by the SERVER FARM. Unadjusted Users are grouped into 4 distinct usage-pattern categories, namely (a) Light, (b) Medium, (c) Heavy, and (d) Super Heavy. Calculations are performed on the number of Users in each grouping to determine the normalized number of Users. These normalized numbers are then summed to establish the ADJUSTED USER TOTAL for the entire SERVER FARM.
2. APPLICATION DELIVERY SOLUTION CONFIGURATOR: This is the Unisys approved and recognized designation of the present method and system as defined by this invention. This is a Windows application that helps one in choosing the best-developed Application Delivery (Thin Client) server solution that will meet a client's requirements. This Solution Configurator guides one through a customer interview session where information is gathered in order to develop a set of solutions that will match the customer's performance requirements but also provide different availability levels suitable to the customer-client.
3. APPLICATION SERVER: This is the intended use or responsibility of one of the designated server farms. This type of server farm would run computer programs or pieces of software designed to perform specific multi-user tasks solely within the Windows Terminal Server systems making up the server farm. APPLICATION SERVERS would not be dependent on other back-end servers for the processing of data.
4. APPLICATION TYPE: This is one of four main interview categories used by the described Thin Client Sizer Tool for collecting customer information and collecting also Application Type documents involving the memory and the disk resources typically required when running an application. By supplying the Application Types that will be running—helps to size the Server Farm in order to sufficiently handle the client demand.
5. APPINPUT: GUI-based—This requires limited User input such as an application developed with Microsoft Visual Basic where selections are made from lists or by clicking various options. Text-based—Requires considerable typing by the User such as creating a document in Microsoft Word.
6. APPOUTPUT: Text-based—Indicates the kind of information presented by the application. For example, most Visual Basic or C++ windows and dialog boxes, most uses of productivity apps (Microsoft Office), terminal emulation, etc. Graphic-based—Indicates the kind of information presented by the application. For example, desktop publishing large documents with graphics, Web pages with a lot of picture content (JPEG files), scanned images (TIF files), Microsoft Encarta, etc.
7. APPPROCESSING: Light—Indicates the application executing on the terminal server does little more than present a GUI. For example, a Visual Basic application, the SAP thin client, light use of productivity apps (Microsoft Office), terminal emulation, etc. Heavy—Indicates the application executing on the terminal server uses more processor, memory or disk resource usage. For example, the PeopleSoft Thin Client, Outlook Exchange client, heavy use of productivity apps for complex tasks (desktop publishing, large documents with graphics, extremely large spreadsheets with complex cascading calculations, etc.)
8. AVAILABILITY: This is a measure of the readiness of the system and an application to deliver an expected service to the User with a required performance level. It may be described as a percentage of time that a system and an application are running as distinguished from the system being down for maintenance or repairs.
9. AVAILABILITY GOAL: This is the target service level as defined by the client for the server farm. This data value is input to the tool as a percentage of time that the client expects the systems and applications in the server farm to be accessible by all Users.
10. AVAILABILITY LEVEL TAB WINDOW (FIG. 24 OF U.S. Ser. No. 09/813,667: This shows the Availability Calculator which helps to determine solutions that include future/growth potential requirements with a variety of redundancy levels. This screen is interactive and will take input for Adjusted Concurrent number of users, system repair times and redundancy levels. This screen is interactive and will take input for Adjusted Concurrent number of users, system repair times and redundancy levels and returns solution information such as estimated number of servers, # peak users, availability, estimated downtime, # redundant servers and server farm mean time to failure (MTTF).

11. BACKGROUND PROCESSING: The ability of a user-interactive software application to execute processing steps independent of the input and output actions. Background processing would include, but is not limited to, procedures such as 'always on' spell checking in a word processor or 'always on' calculations in a spreadsheet.

12. BENCHMARK: This is test of computer performance and consists of a test or set of tests used to measure the performance of an individual e-Action ES Terminal Server. The output from these tests consists of a value designated as the total number of Users that each e-Action ES Terminal Server system can reasonably sustain and process.

13. BASE SOLUTIONS TAB WINDOW (FIG. 23 OF U.S. Ser. No. 09/813,667: Reports the minimum server configuration recommendation (i.e., not including additional redundancy or growth considerations) for each of the customer Site's server farms. A base solution includes the minimum number of servers and GB RAN required with regard to Operating system, # processors and MHz available for each server type supported by Unisys.

14. CITRIX METAFRAME: This is computer software from Citrix Systems, Inc., headquartered in Ft. Lauderdale, Fla. This METAFRAME software is loaded onto each Windows Terminal Server and provides superior enterprise-level management and control functions for the e-@ction Enterprise Servers.

15. CITRIX METAFRAME ADD-ONS: ICA Secure and Load Balancing Services are two optional computer softwares that can be run simultaneously with CITRIX METAFRAME on a Terminal Server. ICA Secure provides enhanced network security for METAFRAME. Load Balancing Services allow Citrix MetaFrame to distribute application processing to the plurality of computer systems in a server farm.

16. CONCURRENT USERS: This number is an estimate of the maximum number of users simultaneously processing applications on a Server Farm at any given time. This is characteristically a percentage of the total Benchmark users that can be sustained on all of the e-@ction Enterprise Servers in the Server Farm.

17. CONFIGURATION DATABASE TEMPLATE: This is a collection of data on a computer applied during the information collection process and utilized for the assembly of information collected from window screens.

18. CONFIGURATION SESSION: This is the vehicle used by the described Thin Client Sizer Tool to collect the information on a customer's sizing requirements and to generate the best solution to meet those requirements.

19. CONFIGURATION SESSION DATABASE: This is a collection of data on a computer used for providing information to an instance of the Application Delivery Solution Configurator that enables algorithmic steps and calculations to be applied in the development of an optimized configuration for the Server Farm.

20. CONFIGURATOR: See APPLICATION DELIVERY SOLUTION CONFIGURATOR.

21. CUSTOMER DATA TAB WINDOW (FIG. 22 OF U.S. Ser. No. 09/813,667: Reports back to the customer the information that was collected during the interview session and that which the solution generation was based on.

22. CUSTOMER PROFILE: This is a collection of data describing the customer's characteristics and attributes and assembled from the customer interview. This data is input to an algorithm which will output a configuration solution for that particular User or customer.

23. DEFAULT AVAILABILITY: The four (4) SERVER FARM initial availability level scenarios as calculated and displayed by the AVAILABILITY CALCULATOR. The availability levels for the Server Farm are calculated based on the following three parameters: (1) the number of adjusted concurrent users, (2) the system repair time, and (3) the REDUNDANCY FACTOR. For the four DEFAULT AVAILABILITY levels, the first parameter is calculated based on the sizing of the SERVER FARM, and the latter two parameters have pre-configured values, as chosen by the Engineering Group, where the second parameter is held constant at 6 hours and the second parameter is varied from 25% to 10% in decrements of 5%.

24. DISK CAPACITY TAB WINDOW (FIG. 27 OF U.S. Ser. No. 09/813,667: Reports on the disk capacity requirements determined by the interview session input and solution generation algorithms for each of the customer Site's Server Farms.

25. DOWNTIME: The downtime or repair time for a single application server is the time interval required to restore the server and system back to normal business operation. At the end of the repair period, the applications running on the repaired server are available to Users. The downtime for a Server Farm is the time interval required to restore the nominal Server Farm performance.

26. e-@TION ENTERPRISE SERVER (ES): This is the specific name for a plurality of server models marketed and sold by Unisys Corporation. Current models include ES7000, ES5000, and ES2000 systems.

27. ESTIMATOR PROGRAM: This is a program which performs method steps for estimating system parameters such as the availability of an application program to run on any computer or server in the cluster of at least two servers or computers. This type of estimator program was the subject of a U.S. Ser. No. 550,603 commonly owned U.S. Pat. No. 6,334,196, which is incorporated herein by reference. Another estimator program is the subject of this patent application.

28. ETO: This represents engineering technology optimization and involves an organization located at a specific company location that is devoted to optimizing the performance of the Enterprise-class Windows NT Server platforms.

29. FAILOVER: This is a mode of operation in the system which has two or more servers or computers wherein a failure in one of the servers or computers will result in transfer of operations to the other or another one of the still operating servers and computers. Failover time is the period of time required for successful transfer from a failed server to an operative server.

30. INPUT CHARACTERISTICS: These attributes describe how input is provided to the customer's software applications—through textural typing, through GUI based screen manipulation, or through a combination of both methods.

31. KBPS REQUIREMENTS (SERVER FARM): This is the total data transmission capacity (or bandwidth), measured in kilobytes per second (Kbps), which will be needed for all bi-directional communication between the Users' concurrent connections and the SERVER FARM(s).

32. MB (MEGABYTE): A unit of computer memory or disk storage space equal to 1,048,576 bytes.

33. MEAN TIME TO FAILURE (MTTF): This is the average operating time between two failures, that can be estimated as the total operating time divided by the number of failures.

34. MEAN TIME TO REPAIR (MTTR): This is the average "downtime" in case of failure, that can be estimated as the total downtime divided by the number of failures.

35. MEMORY REQUIREMENTS: This is the necessary amount of server memory used by each User's instance of the multi-user software application.

36. NETWORK CAPACITY TAB WINDOW (FIG. 26 OF U.S. Ser. No. 09/813,667: This is called Network Utilization now; reports on the estimated network activity measured in Kbps for each of the customer Site's Server Farms.

37. OUTPUT CHARACTERISTICS: These attributes describe how output is derived from the customer's software applications—through the display of visual information as text, as graphics, as animated graphics, or as a combination of one or more methods.

38. OPTIMIZATION CRITERION: This is a function that determines the value of one of the essential system attributes and must be minimized (or maximized) by variation of one or more system parameters that are chosen as OPTIMIZATION PARAMETERS. Each optimization parameter should have a predefined domain that defines the values that the optimization parameter may assume. The OPTIMIZATION CRITERION is a focus of an optimum system design or configuration. The examples of the optimization criteria are system performance, system availability, and cost of ownership.

39. OPTIONAL SOFTWARE TAB WINDOW (FIG. 25 OF U.S. Ser. No. 09/813,667: Reports on the additional features/capabilities entered in the interview session regarding the customer's profile for each of the Site's Server Farms. Optional software requirements include such categories as Client Connection Methods, Enhancements, Environment support, Multimedia capabilities, Display characteristics, Protocol support, and Server Enhancements.

40. PROCESSING CHARACTERISTIC: This attribute describes whether the customer's software application performs extensive BACKGROUND PROCESSING, independent from the processing of application input and output.

41. REDUNDANCY FACTOR (Rf): This is a measure of the additional number of Users that can be added to the nominal number of Users per server without exceeding the maximum number of Users per server (server performance benchmark maximum of Users). It is a difference between maximum and nominal performance as a percentage of the maximum performance. The Redundancy Factor can be calculated as 100 percent minus a usage factor Uf.

42. SERVER CONFIGURATION REPORT: This is a report generated by the Thin Client Sizer Tool that will contain the information on the optimum server configurations as determined by the customer information which was collected during the Configuration Session and the performance benchmarking results.

43. SERVER FARM: This is one of the five main interview categories used by the Thin Client Sizer Tool for collecting customer information. A Server Farm consists of one or more Windows Terminal Servers configured together for unified administration, security, and for communication services. For instance, two Server Farms might be required for certain applications such as the PeopleSoft clients, or one server for a Payroll function, and another server for a Human Resources function.

44. SERVER FARM AVAILABILITY CALCULATOR: This is an estimator program that estimates the availability for the Server Farm.

45. SERVER FARM OVERFLOW: The condition whereby the results of calculations on the number of servers in a SERVER FARM, during the Solution Generation phase, exceeds the maximum number of servers recommended for a SERVER FARM as determined by the Engineering Group.

46. SERVER INFORMATION DATABASE: This is a collection of data on a computer for holding benchmark and informational data on a plurality of Unisys Enterprise Server systems. This data is used by the Thin Client Sizing Tool in determining the optimum server farm configuration to meet the customer's sizing requirements.

47. SITE: This is one of the five main interview categories used by the Thin Client Sizer Tool for collecting customer information. A Site is the physical location where the Windows Terminal Servers will be located in particular cities such as, New York, Los Angeles or Chicago, etc. and the number of users at that physical location.

48. SITE/SERVER FARM PAIR: This is a defined combination of a specific Server Farm residing within a particular physical location. As defined during the customer interview, each physical location, or site, can contain one of more Server Farms. When defining the User and Application characteristics of each Server Farm within the site, each individual combination is considered as an independent pair.

49. SIZING DATABASE: This is a collection of data on a computer output from the THIN CLIENT SERVER FARM AVAILABILITY CALCULATOR and used for storing the number of e-@ction Enterprise Server unit modules and their availability levels.

50. SOLUTION CONFIGURATOR: See APPLICATION DELIVERY SOLUTION CONFIGURATOR.

51. SOLUTION GENERATION: The act of producing a particular SERVER FARM configuration (i.e. the SOLUTION) that will meet the sizing and availability requirements of a client. This SOLUTION will be comprised of an appropriate number of servers, proper disk space and memory to meet the client requirements.

52. THIN CLIENT SERVER FARM AVAILABILITY CALCULATOR: This is one of the examples of the SERVER FARM AVAILABILITY CALCULATOR. Because Thin Client configurations are intended to make applications available to multiple Users at the same time, this calculator calculates the availability of a specified number of instances of an application (not just a single instance) where each application instance is being run at the server, but all the User input response is taking place at the client terminal. In this scenario, downtime occurs whenever the number of available instances of the application drops below the required specified number of instances.

53. UCON32: This is the unit designated as the Unisys Configurator which is an extensive on-line configuration tool which is used to support all Unisys Corporation system platforms.

54. USAGE FACTOR (Uf): This is the ratio of the nominal number of Users per server to the maximum number of Users per server (server performance benchmark maximum of Users) times 100 percent.

55. USER-TYPE: This is one of the five main interview categories used by the Thin Client Sizer Tool for collecting customer information. A User-Type embodies the usage patterns of a particular group of Users. User usage patterns will have a significant impact on performance.

The area which is considered here is the user's typing speed. Some examples of User-types are, order entry clerks, secretaries, developers, and technical writers.

56. USER WEIGHT: This is the estimated average user impact (light, medium, heavy or super heavy) on the Windows Terminal Server, and a value is assigned to each User Type by the sizing tool. Such User attributes as typing speed or application familiarity can all affect this parameter. It is used to approximate the amount of server processor usage that is imposed by the different User Types.

57. WINDOWS TERMINAL SERVER: This is the designation for an e-@action Enterprise Server that is running one of two operating systems sold and supported by Microsoft Corporation: (1) Windows NT Server 4.0, Terminal Server Edition, or (2) Windows 2000 (Server, Advanced Server, or Datacenter Server) with the optional Terminal Services service enabled in Application Server mode.

DESCRIPTION OF PREFERRED EMBODIMENT

Figure 2:
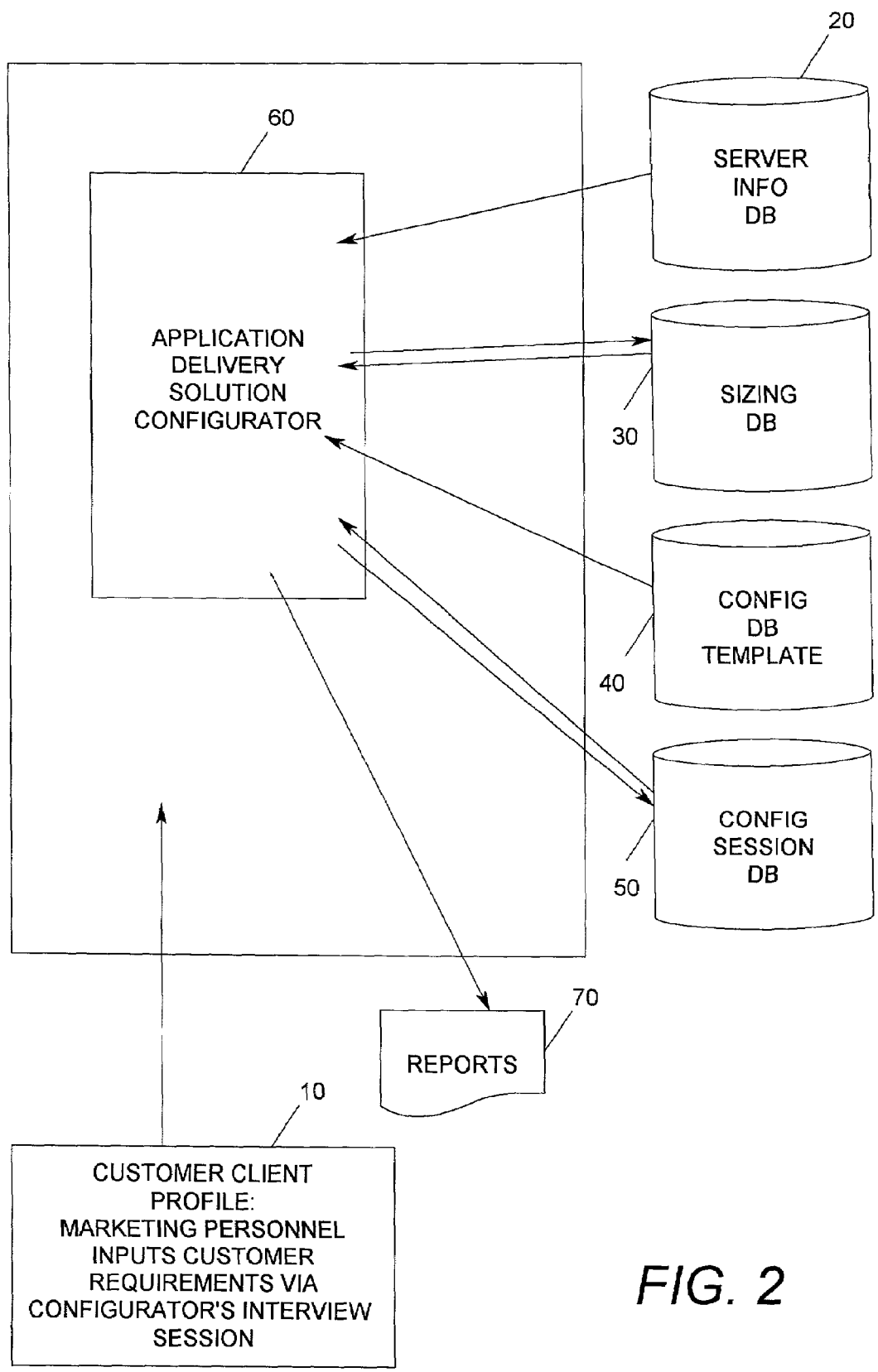
FIG. 2 is a drawing of the generalized overall environment involved in the application delivery solution configurator.

As is indicated in the overall system view for an Enterprise Server operation as shown in FIG. 2, a customer client profile 10 is developed from inputs indicating the customer's requirements, which is done by means of the configurator's interview session using a set of windows with inputs, as was illustrated in co-pending U.S. Ser. No. 09/813,667.

The algorithm for the Application Delivery Solution Configurator 60 is shown in FIG. 2 having inputs from the server information database 20, from the configuration database template 40, plus two-way communication between the sizing database 30 and the configuration session database 50.

Figure 3:
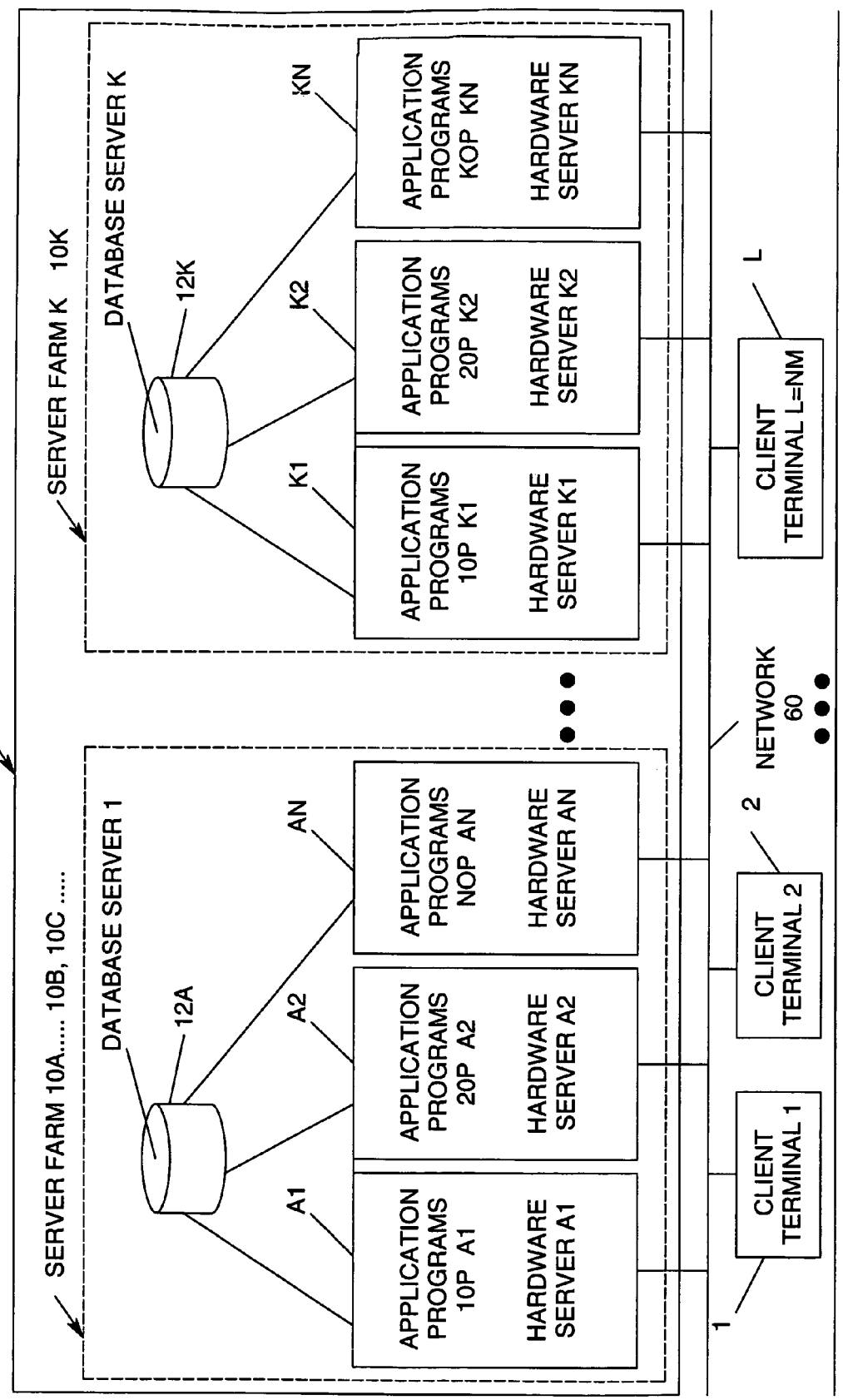
FIG. 3 is a drawing of a typical Metafarm (group of Server Farms) which indicate how a particular enterprise customer's requirements may be configured.

FIG. 3 is an example of a particular type of configuration known as a Server Metafarm 8. The Metafarm 8 may include a number of Server Farms designated as 10A, 10B, 10C . . . 10K. Each of the Server Farms will be seen to have a disk database server and a series of application programs with hardware servers. For example, Server Farm 10A will have a disk database server 12A, which is attached to a series of application programs 10P A1; 20P A2. Each of these programs is associated respectively with a particular hardware server A1, A2 and NOP AN.

Similarly, each one of the Server Farms, for example, such as the Server Farm 10K will also have a disk database server 12K and a series of hardware servers K1, K2, and KN, each of which has application programs designated as 10P K1; 20P K2; KOP KN.

A network 60 provides bus interconnection from each of the hardware servers with their application programs over to a series of client terminals 1, 2, . . . L.

The configuration as to the number of servers, the number of application programs, their usage and the numbers of client terminals on the network are all subject to many different types of configurations which must be tailored to provide a suitable enterprise system for a particular customer. The Thin Client Sizing Tool enables the appropriate design configuration to be developed to meet the needs and requirements of the particular customer.

As a result of the method steps and algorithmic operations involved and utilizing the data which is fed into the databases accessed and into the various windows of the associated PC (personal computer), there is developed a final set of output reports 70 (FIG. 2) generated which will provide an optimized configuration suitable for the customer's requirements.

One portion of the Application Delivery Solution Configurator 60 is the solution generation method involved in FIGS. 1A through 1D. Here, it will be noted that there are a series of steps designated D1, D2, D3 . . . through D29, which will illustrate the various steps involved in order to complete the solution generation portion of the Thin Client Sizing Tool.

A Solution Generation with a simple concrete example will be described hereinbelow in conjunction with steps D1 . . . D29 of FIGS. 1A through 1D.

Before starting to generate a solution, a customer profile must have been gleaned via the configurator's interview process as indicated in co-pending U.S. Ser. No. 09/813,671. The resulting customer profile of the interview process act as input into the Solution Generation process and are stored in the Configuration Session DB 50 of FIG. 2, as also described in U.S. Ser. No. 09/813,667. By showing an example of a relatively small customer, the Customer Profile might look like the following:

Site: Customer 2K (2000 total users)
  (i) Farm: "Manufacturing" (800 concurrent users) where:
    400 Developers use Microsoft (MS) Internet Explorer and needing 200 MB working disk space; and
    100 Testers use MS Internet Explorer and needing 25 MB disk space; and
    300 Testers use IOCooker (application program) needing 100 MB disk space;
  (ii) Farm: "Engineering" (650 concurrent users) where:
    300 Developers use an Attachmate terminal emulator needing 50 MB disk space; and
    200 Developers use MS Internet Explorer needing 20 MB disk space; and
    100 Developers use MS Access 97 needing 10 MB disk space; and
    50 Developers use IOCooker needing 5 MB disk space;
  (iii) User Type Attributes include
  Developers—insignificant average typing speed used.
  Testers—insignificant average typing speed used.
  (iv) Application Attributes:
  MS Internet Explorer:—32-bit application requiring 70 MB disk, 20 MB memory, text-based I/O and "light" background processing.
  IOCooker:—16-bit application requiring 20 MG disk and 2 MB memory, mostly text-based I/O and "heavy" background processing.
  Attachmate terminal emulator:—32-bit application with GUI-based input, text-based output and "light" background processing.
  MS Access 97:—32-bit application requiring 40 MB disk, 8 MB memory, mostly GUI-based input, text-based output and "heavy" background processing.

With this sample customer's profile in mind, the Solution Generation begins by considering each site as seen at step (D1). In this particular example, only one site, Customer 2K, is defined. Then for each of the site's Server Farms at step (D2), starting with Manufacturing (i), the process of step D3 asks "Were there any features/capabilities selected?" (D3). If the answer here is "YES", the Server Farm's feature/capabilities information is appended to the Optional Software report and Tab window at step (D3Y). If the answer is "NO", as in this example, the flow sequence continues to step D4 where a loop through the User Types begins. The Loop involves steps D4 through D8 and returns to D4.

The User Type "Developers" of Farms (i) is considered first. Each specific Application used by Developers is then considered at step (D5), beginning with Internet Explorer.

The disk capacity required for 400 Developers using Internet Explorer is added to the Server Farm's total disk capacity requirements at step (D6). Further, the Application name and its disk capacity requirements are added to a small, temporary multi-dimensional array, as seen in Table I.

TABLE I

Multi-dimensional array for Application Disk Requirements

| Index | Application Name | Application User Disk Requirements | Application Installation Disk Requirements |
|---|---|---|---|
| 0 | Internet Explorer | 200 MB | |
| 1 | | | |

It may be noted that the Application Installation Disk Requirements dimension will be filled-out in another part of the Sizing Tool algorithm. Then at step (D6a) it is noted that memory requirements are calculated for each user type using the application, here for Developers using Internet Explorer. This information is also stored in a multi-dimensional array. This method is described in more detail in co-pending U.S. Ser. No. 09/813,669, which includes details on the algorithm to Calculate Memory Requirements).

The question block at step (D7) is then asked if there is "Another Application?", which in this example is answered YES and the flow returns to (D5) to handle the next Application involved which is IOCooker. This next application, IOCooker, is considered with respect to Developers. At step (D6), the disk capacity required for 0 Developers is 0, which is added to the application total, leaving it unchanged and the multi-dimensional array for disk requirements now contains an entry shown in Table II for IOCooker, as follows:

TABLE II

Multi-dimensional array for Application Disk Requirements

| Index | Application Name | Application User Disk Requirements | Application Installation Disk Requirements |
|---|---|---|---|
| 0 | Internet Explorer (MS) | 200 MB | |
| 1 | IOCooker | 0 | |
| 2 | | | |

Step D6A is then considered so that memory requirements are calculated for the user-type users using the application (Developers using IOCooker) as detailed in Ser. No. 09/813,669. It is safe to say that no memory requirements are accumulated for 0 Developers. Then "Another Application?" is asked again at step (D7) and is answered "NO" after which the sequence dictates that the question "Another User Type?" is asked at step (D8) and answered "YES", which loops back to step (D4).

The User Type, Testers (in Farm (i)), is considered next at step (D4) and the first application considered with regards to Testers (in Farm (i)) is the Internet Explorer, step (D5). The disk capacity (25 MB) for 100 Testers using Internet Explorer is added to the Internet Explorer total disk capacity (200 MB at step D6), thus updating the multi-dimensional array for disk requirements as seen in Table III:

TABLE III

Multi-Dimensional array for Application Disk Requirements

| Index | Application Name | Application User Disk Requirements | Application Installation Disk Requirements |
|---|---|---|---|
| 0 | Internet Explorer | (200 + 25) MB | |
| 1 | IOCooker | 0 | |
| 2 | | | |

Then step D6A calculates the memory requirements for Testers using Internet Explorer. And next the question "Another Application" at step (D7) is answered "YES" and the IOCooker Application is now considered with respect to Testers (D5) in Manufacturing Farm (i). The total disk capacity is incremented for 300 Testers using IOCooker by adding 100 MB disk for the user working disk capacity requirements for each User type using the Application at step (D6), and is shown in Table IV.

TABLE IV

Multi-Dimensional array for Application Disk Requirements

| Index | Application Name | Application User Disk Requirements | Application Installation Disk Requirements |
|---|---|---|---|
| 0 | Internet Explorer | (225) MB | |
| 1 | IOCooker | (0 + 100) MB | |
| 2 | | | |

Again the memory requirements are calculated this time for Testers using IOCooker at step D6A. At this point, "Another Application?" (D7) is answered with "NO" and "Another User Type?" (D8) is also asked and answered with "NO". The flow sequence then continues so that the Application sizing information is retrieved at step (D9) from the Sizing Database, FIG. 2, item 30. The applications' disk installation requirements are added to the multi-dimensional array as seen in Table V.

TABLE V

Multi-Dimensional array for Application Disk Requirements

| Index | Application Name | Application User Disk Requirements | Application Installation Disk Requirements |
|---|---|---|---|
| 0 | Internet Explorer | (225) MB | 70 |
| 1 | IOCooker | 100 | 20 |
| 2 | | | |

The Total Disk Capacity is then calculated for the Server Farm at step (D10) by adding the Application User Disk requirements for each application and the Application installation Disk Requirements for each application, so that:

Total Disk Requirements=225+100+70+20=415 MB (Step D10)

With the information in the multi-dimensional array for the Total Disk requirements, the Disk Capacity report and Tab window information is filled-out at step (D11) followed by the Customer Data report and Tab window at step (D12) for the Server Farm.

Then, the User Weights are calculated at step (D13). For the "Manufacturing" Server Farm (i), the user weighting algorithm shows:

0 Light users

500 Medium users

0 Heavy users

300 Super Heavy users

Basically, user weighting considers the application input/output and processing attributes and the number of users as indicated in co-pending U.S. Ser. No. 09/813,668, which includes details on the algorithm to Calculate User Weights].

At step (D14) (FIG. 1C), a loop through the servers begins. Each server's information is retrieved at step (D15) from the Server Info Database, (item 20, FIG. 2) including information as to how each user weight is factored for the server. Each user weight is determined on a server-by-server basis, factoring server benchmark results against a typical benchmark user. The following weighting factors in Table VI are customary and will be used within this example for all server types.

TABLE VI

Resource Weighting Factors

Light users = use 50% of the resources of a benchmark user
Medium users = use 67% of the resources of a benchmark user
Heavy users = use 100% of the resources of a benchmark user
Super Heavy users = use 200% of the resources of a benchmark user Light users are customarily considered to be 50% of a typical benchmark user, Medium users 67%, Heavy users 100% (i.e., Heavy users are considered to use the same amounts of resources as benchmark users) and Super Heavy 200%. The Server Farm's adjusted user total is then calculated (D16) based on the following formula:

Adjusted User total =

<#Light users> * <Light user factor> +
<#Medium users> * <Medium user factor> +
<#Heavy users> * <Heavy user factor> +
<#Super Heavy users> * <Super Heavy factor> =
(0 * 0.50) + (500 * 0.67) + (0 * 1.00) + (300 * 2.00) =
0 + 335 + 0 + 600 =
935 adjusted users

[where * is a symbol representing multiplication].

At step (D17), the total Kbps (kilobits/second transmission rate) requirements are estimated on a server basis again considering the user weights and benchmark information which was retrieved at step D15 in the Server Info database (20, FIG. 2). The following Kbps factors are customary and will be used within this example for all server types:

TABLE VII

Network Utilization Weighting Factors

Light users = 10 Kbps
Medium users = 15 Kbps
Heavy users = 20 Kbps
Super Heavy users = 20 Kbps The Server Farms Network Utilization is then estimated at step (D17) using the following algorithm:

Estimated Network Activity =

<#Light users> * <Light user Network factor> +
<#Medium users> * <Medium user Network factor> +
<#Heavy users> * <Heavy user Network factor> +
<#Super Heavy users> * <Super Heavy factor> =
(0 * 10) + (500 * 15) + (0 * 20) + (300 * 20) =
0 + 7500 + 0 + 6000 =
13,500 Kbps (Kilobits/sec transmission rate).

Next, the "number of servers" required to sustain the resource requirements for the Server Farm is determined at step (D18). The Adjusted user total (=935) calculated above is used for this determination in addition to the server benchmark testing numbers that indicate the recommended number of users sustainable on that server. If, during benchmark testing, it is determined that the particular server being tested could sustain 88 typical benchmark users, this number would be stored in the Server Info Database (FIG. 2; item 20) and would have been retrieved from the Database in step (D15).

The Adjusted User total of 935 is then divided by this benchmark number of 88 to determine the number of users required for the customer's configuration showing (935/88) and rounding it up if it doesn't divide evenly. Thus, 11 of the particular Server model being considered would be required in a base solution configuration for this customer's Server Farm. This establishes a first estimation of 11 Servers per Farm.

The decision block question (D19) is then asked—Is 11 servers "Too Many Servers?", step (D19), to which the answer is "NO" in this example. "Too many servers" in a Server Farm is determined, for example, by engineering to be more than 160 servers. This number is determined based on MTTF calculation overflow conditions and common sense with regard to ease of manageability. With the "NO" answer, Memory Requirements are calculated at step (D19N) as indicated in co-pending U.S. Ser. No. 09/813,669, which gives details on the algorithm to Calculate Memory Requirements.

If the answer at (D19) of "Too Many Servers?" had been "YES", the flow sequence would have continued to (D19Y) where the Server Farm name is added to a list for a warning display at the end of the solution generation. The Server Overflow flag is an indicator (designated True or False) that there exists a server that exceeds the maximum number of recommended servers per farm and that is set to "TRUE" at (D19Y2) to indicate that there does exist a server(s) that exceed the maximum number of recommended servers per farm. The algorithm joins again with the "NO" path at (D20) where the Base Solution report and Tab windoware filled-out with the total number of servers involved and the memory required for the Server Farm's base or minimum configuration solution (i.e., with no additional redundancy included). For example, the following base solution for the server is displayed as:

11->ES2044 Pentium III Xeon 550 MHz using Windows NT 4.0 TSE with 4 processors and 732 MB RAM.

If the Server Overflow flag is set TRUE (D19Y2) however, a message, indicating that the solution for this Server Farm exceeded the maximum number of servers allowed,—and is displayed instead of displaying the solution.

Then, the next step is to calculate "default availability levels" at step (D21) and fill-in the Availability report and Tab window which consists of an interactive Availability Calculator that is initially loaded with the four default availability level scenarios (D22). The Availability calculator involves a table of server farm attributes that are manipulations of the base solution with regard to 3 variable factors; the number of adjusted concurrent users, the system repair time and the redundancy factor. For example, the base solution is reconfigured with 25%, 20%, 15%, and 10% redundancy. Estimated information about the number of servers, peak number of users, number of redundant servers Mean Time to Failure, estimated Availability and downtime are displayed with respect to the manipulated solution. The commonly owned U.S. Pat. No. 6,496,948 illustrates the details on Calculating Availability.

Then, the Network Capacity Utilization report and Tab window are filled-in at step (D23) with the Server Farm's estimated network activity for this server model (D23). At this point, all of the reports/tab windows have been filled-in with the current Server and Server Farm information.

The Overflow flag, which indicates server overflow conditions, is re-initialized to FALSE at step (D24) to begin the iteration of the next loop regarding the next server model supported and the question "Another Server Farm" is posed at step (D25). Here, the loop (D14) to (D26) is reiterated so that a base solution is generated for all supported server models with benchmark information stored in the Server Info Database (20, FIG. 2).

When base solutions for the Manufacturing Server Farm (i) have been generated for all of the servers, the next step (D26) is the question block "Another Server Farm?" (D26). In this example, the answer would be "YES" and then the steps (D2) to (D26) are then performed with regard to the Server Farm named Engineering (ii), which has 650 concurrent Users.

When base solutions for the Engineering Server Farm (ii) have been generated for all of the servers, the question at step (D26) "Another Server Farm?" is again posed, and this time answered with "NO" (i.e., no more Server Farms other than (i) and (ii), thus concluding the loop through the Site's Server Farms which originally started at (D3) with the question "Another Site?").

Now, if the Server Farm Overflow list is NULL at step (D27), flow continues to (D28) but if the Server Farm Overflow list is not NULL at step (D27), the flow sequence continues to step (D27N) and a Warning Message is displayed indicating that there are one or more Server Farms in the Site which had base solutions that "exceeded" the maximum number of servers recommended for a Server Farm. Thus, in this case, the recommendation for action would be for the Customer-User to return to the configuration interview session and reconsider the number of Users which were assigned to the "overflowed" Server Farm so that the users are divided among more server farms and the maximum number of servers required per farm would no longer be exceeded. This alteration of the customer profile would cause the solution generation outcome to be free of overflow warnings.

The question at step (D28) "Another Site?" is now posed and answered, for this example, with "No" and the Solution Generation is considered complete. The tab windows are enabled, or become accessible, and the solution information written to the tab windows is available for viewing and the reports are available for printing.

However, if the answer at step (D28) had been "YES", that is—there are more Sites, then the Server Farm Overflow list is reset to NULL (D28Y) so that the last Site's Server Farm overflow list is not passed on to the next Site and the marker "A, SEE FIG. 1A" sets the sequence back to step (D1). Another solution is then generated for the next Site which would be considered when stepping through the loop, steps (D1) through (D28).

Described herein has been a method for generating a configuration solution utilizing a Thin Client Sizing Tool in order to provide an optimum or desired configuration of, for example, a Server Farm or multiple Server Farms, for a particular customer. This solution is based on engineering provided benchmark test data for designated types of servers in order that the customer profile information about the number and types of users and the types of applications employed can be used as input to decide upon the appropriate number of servers and farms which can be configured together with the appropriate disk space and memory requirements, thus to satisfy the particular specifications and requirements of a given customer.

While many other types of embodiments may be utilized but which still encompass the concept of the inventive disclosure herein, it should be understood that the invention is defined by the following claims.

What is claimed is:

1. A method utilizable by a Thin Client: Sizing Tool, for configuring Server Farms and for generating a proposed configuration of Servers and associated support apparatus established at one or more sites which will satisfy the requirement of a given Customer's Profile in regard to establishing a number of servers for each Server Farm which would be the most appropriate number of servers satisfying a given Customer's Profile, comprising the steps of:
　(a) calculating a basic solution for establishing the appropriate number of servers and types of associated support apparatus, for each site and for each Server Farm and wherein said Customer's Profile establishes the required amount of disk capacity which will be required for each User-type in using each particular application program, and wherein step (a) of calculating includes the steps of:
　　(a1) retrieving from said Customer's Profile specific features and capabilities for each Server Farm at each site;
　　(a2) retrieving from said Customer's Profile each User-type involved in each Server Farm;
　　(a3) retrieving from said Customer's Profile each application program name used by each User-type in each Server Farm;
　　(a4) retrieving from said Customer's Profile the required amount of disk capacity for each User-type using each application program and wherein said Customer's Profile provides information on the disk capacity requirement for each single Server Farm and wherein step (a4) further includes the steps of:
　　　(a4a) calculating the disk capacity requirement for a single Server Farm;
　　　(a4b) inserting the disk capacity requirement information onto a Disk Capacity Report;
　　and wherein said Customer's Profile provides the actual User-Weight indicating user-usage as being light, medium, heavy or super-heavy, and wherein step (a4) includes the steps of:
　　　(a4c) filling out a Customer Data Report;
　　　(a4d) calculating the actual User-Weight for each User-type operating with each application program wherein a Server Information Database provides information as to the normal total number of users that will be supported by a Server Farm and said number is designated the adjusted total of users, and wherein step (a4d) includes the steps of:
  (a4d1) accessing said Server Information Database for Server data;
  (a4d2) calculating for each Server Farm the adjusted total of users for each application program wherein said Server Information Database provides means to calculate the required data transmission capability needed for bi-directional communication between users and said Server Farm, and wherein step (a4d2) includes the steps of:
    (a4d2a) calculating, for each Server Farm, the required data transmission capability in kilobits per second;
    (a4d2b) calculating the number of Servers to service the Customer's configuration.

2. A method utilizable by a Thin Client Sizing Tool, for configuring Server Farms and for generating a proposed configuration of Servers and associated support apparatus established at one or more sites which will satisfy the requirement of a given Customer's Profile in regard to establishing a number of servers for each Server Farm which would be the most appropriate number of servers satisfying a given Customer's Profile, comprising the steps of:
  (a) calculating a basic solution for establishing the appropriate number of servers and types of associated support apparatus, for each site and for each Server Farm and wherein said Customer's Profile establishes the required amount of disk capacity which will be required for each User-type in using each particular application program, and wherein step (a) of calculating includes the steps of:
    (a1) retrieving from said Customer's Profile specific features and capabilities for each Server Farm at each site;
    (a2) retrieving from said Customer's Profile each User-type involved in each Server Farm;
    (a3) retrieving from said Customer's Profile each application program name used by each User-type in each Server Farm;
    (a4) retrieving from said Customer's Profile the required amount of disk capacity for each User-type using each application program and wherein said Customer's Profile provides information on the disk capacity requirement for each single Server Farm and wherein step (a4) further includes the steps of:
      (a4a) calculating the disk capacity requirement for a single Server Farm;
      (a4b) inserting the disk capacity requirement information onto a Disk Capacity Report;
    and wherein said Customer's Profile utilizes an Application Delivery Solution Configurator to determine the required amount of memory capacity appropriate to each Server Farm, and, which includes the steps of:
  (i) calculating the required amount of memory capacity for each Server Farm;
  (ii) developing a Base Solutions Report having a base solution which indicates the number of Server Farms, the number of Servers in a Farm, plus disk and memory requirements for each Server Farm said step of developing including the steps of:
    (iia) calculating a set of Default Availability Levels which characterize said base solution;
    (iib) filling-out an Availability Report indicating said Availability Level.

3. A method utilizable by a Thin Client Sizing Tool, for configuring Server Farms and for generating a proposed configuration of Servers and associated support apparatus established at one or more sites which will satisfy the requirement of a given Customer's Profile in regard to establishing a number of servers for each Server Farm which would be the most appropriate number of servers satisfying a given Customer's Profile, comprising the steps of:
  (a) calculating a basic solution for establishing the appropriate number of servers and types of associated support apparatus, for each site and for each Server Farm and wherein said Customer's Profile establishes the required amount of disk capacity which will be required for each User-type in using each particular application program, and wherein step (a) of calculating includes the steps of:
    (a1) retrieving from said Customer's Profile specific features and capabilities for each Server Farm at each site;
    (a2) retrieving from said Customer's Profile each User-type involved in each Server Farm;
    (a3) retrieving from said Customer's Profile each application program name used by each User-type in each Server Farm;
    (a4) retrieving from said Customer's Profile the required amount of disk capacity for each User-type using each application program and wherein said Customer's Profile provides information on the disk capacity requirement for each single Server Farm and wherein step (a4) further includes the steps of:
      (a4a) calculating the disk capacity requirement for a single Server Farm;
      (a4b) inserting the disk capacity requirement information onto a Disk Capacity Report;
    and wherein said Customer's Profile provides the actual User-Weight indicating user-usage as being light, medium, heavy or super-heavy, and wherein step (a4) includes the steps of:
      (a4c) filling out a Customer Data Report;
      (a4d) calculating the actual User-Weight for each User-type operating with each application program wherein a Server Information Database provides information as to the normal total number of users that will be supported by a Server Farm and said number is designated the adjusted total of users, and wherein step (a4d) includes the steps of:
        (a4d1) accessing said Server Information Database for Server data;
        (a4d2) calculating for each Server Farm the adjusted total of users for each application program wherein said Server Information Database provides means to calculate the required data transmission capability needed for bi-directional communication between users and said Server Farm, and wherein step (a4d2) includes the steps of:
          (a4d2a) calculating, for each Server Farm, the required data transmission capability in kilobits per second;
          (a4d2b) calculating the number of Servers to service the Customer's configuration;
    wherein said Customer's Profile utilizes an Application Delivery Solution Configurator to develop a Network Capacity Report on a window which indicates the estimated network activity (Kbps) for each Server Farm at each customer site, and displays the entire network solution as to the minimum number of Server Farms, the minimum number of Servers per Farm, the required operating system memory amount, the number of and speed of processors for each type of server used, all done for each customer site, and wherein step (a4d2b) includes the steps of:

(i) filling-in a Network Capacity Report which indicates the transmission capacity (kilobits/sec) for the enterprise Server Farm network;
(ii) displaying the Network Capacity Report of the entire network solution on a Window screen.

* * * * *